(12) United States Patent
Suezawa

(10) Patent No.: US 11,093,804 B1
(45) Date of Patent: Aug. 17, 2021

(54) INFORMATION PROCESSING APPARATUS AND NON-TRANSITORY COMPUTER READABLE MEDIUM STORING PROGRAM

(71) Applicant: FUJIFILM BUSINESS INNOVATION CORP., Tokyo (JP)

(72) Inventor: Yoshihito Suezawa, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/060,410

(22) Filed: Oct. 1, 2020

(30) Foreign Application Priority Data

Mar. 6, 2020 (JP) .............................. JP2020-039187

(51) Int. Cl.
*G06K 9/64* (2006.01)
*G06T 11/60* (2006.01)
*G06F 3/0482* (2013.01)
*G06K 9/00* (2006.01)

(52) U.S. Cl.
CPC ............ *G06K 9/64* (2013.01); *G06F 3/0482* (2013.01); *G06T 11/60* (2013.01); *G06K 9/00671* (2013.01)

(58) Field of Classification Search
CPC ......... G06T 11/00; G06T 11/60; G06T 19/00; G06T 19/006; G06T 19/20; G06F 3/011; G06F 3/0482; G06K 9/00671; G06K 9/64
USPC ....................................................... 345/633
See application file for complete search history.

(56) References Cited

U.S. PATENT DOCUMENTS

| 8,751,969 | B2 | 6/2014 | Matsuda et al. |
| 9,772,683 | B2 | 9/2017 | Matsuda |
| 2012/0038669 | A1* | 2/2012 | Lee ...................... G06F 3/0486 345/633 |
| 2012/0113223 | A1* | 5/2012 | Hilliges .................... G06F 3/00 348/46 |
| 2014/0198129 | A1* | 7/2014 | Liu ...................... G06F 3/04815 345/633 |
| 2017/0220103 | A1* | 8/2017 | Lin ..................... H04N 21/4223 |
| 2018/0253141 | A1* | 9/2018 | McCracken ....... G02B 27/0172 |
| 2019/0147587 | A1* | 5/2019 | Mullins ................ G06T 7/0008 382/103 |
| 2020/0250879 | A1* | 8/2020 | Foster .................. G05D 1/0276 |
| 2021/0103730 | A1* | 4/2021 | Goslin .................... G06F 3/012 |

FOREIGN PATENT DOCUMENTS

| JP | 2010-257359 A | 11/2010 |
| JP | 2011-28309 A | 2/2011 |
| JP | 2013-93031 A | 5/2013 |
| JP | 2013-168167 A | 8/2013 |

* cited by examiner

*Primary Examiner* — Sae Won Yoon
(74) *Attorney, Agent, or Firm* — Oliff PLC

(57) ABSTRACT

An information processing apparatus includes a processor configured to set a first reference object, and if a second reference object identical or similar to the first reference object is recognized, virtually display a target object in relation to the second reference object. The target object is recognized in advance together with the first reference object.

14 Claims, 16 Drawing Sheets

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-039187 filed Mar. 6, 2020.

BACKGROUND

(i) Technical Field

The present disclosure relates to an information processing apparatus and a non-transitory computer readable medium storing a program.

(ii) Related Art

There is known a technology for displaying an image of an object in a virtual space in relation to an object in a real space.

Japanese Unexamined Patent Application Publication Nos. 2011-28309 and 2013-168167 describe apparatuses in which a cursor or an object moving out of a display area of a PC or the like is displayed as a virtual object.

Japanese Unexamined Patent Application Publication Nos. 2013-93031 and 2010-257359 describe apparatuses in which data that is not displayed in a display area of a PC is set as a virtual object and laid over, for example, a finger of a user's hand.

SUMMARY

Aspects of non-limiting embodiments of the present disclosure relate to virtual reproduction of an object recognized together with a reference object in relation to an object identical or similar to the reference object.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to set a first reference object, and if a second reference object identical or similar to the first reference object is recognized, virtually display a target object in relation to the second reference object. The target object is recognized in advance together with the first reference object.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
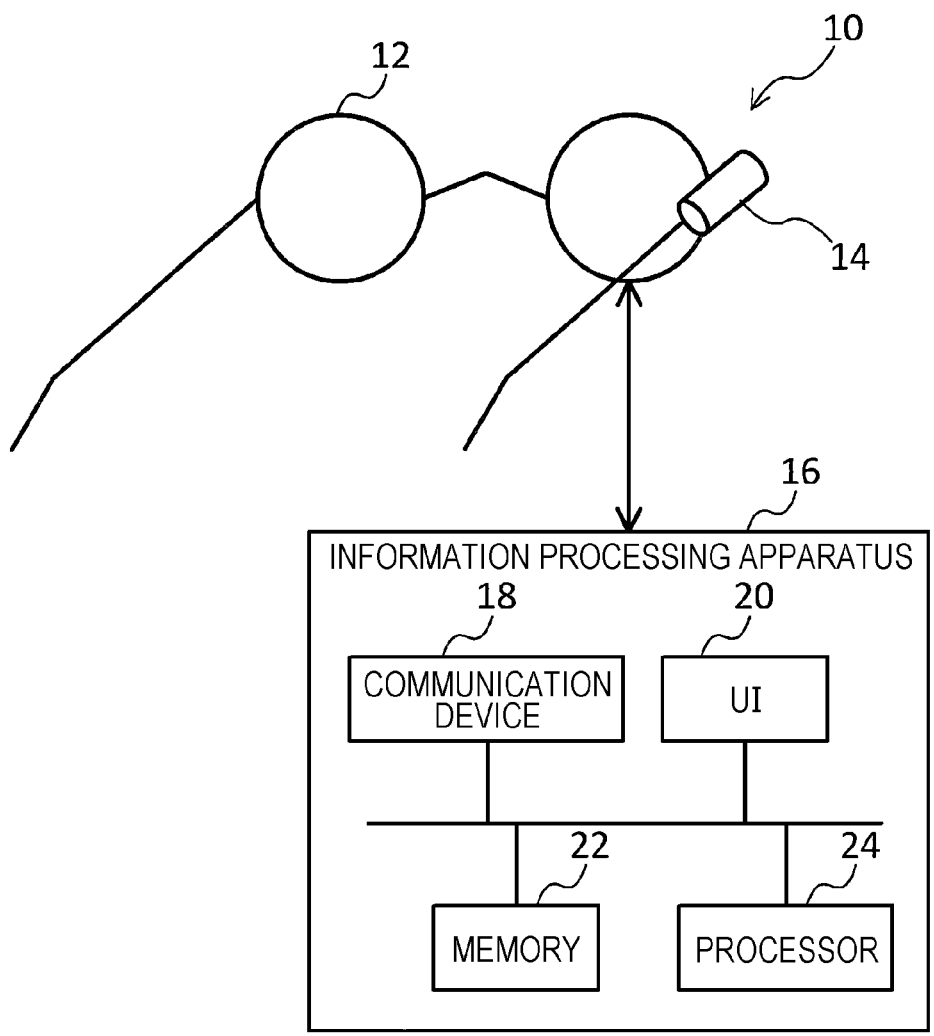
FIG. 1 is a block diagram illustrating the configuration of an information processing system according to a first exemplary embodiment.

An information processing system according to a first exemplary embodiment is described with reference to FIG. 1. FIG. 1 illustrates an example of the hardware configuration of the information processing system according to the first exemplary embodiment.

The information processing system according to the first exemplary embodiment displays a virtual object in a real space by using a technology such as augmented reality (AR) or mixed reality (MR). For example, AR is employed and AR glasses 10 are used as an information processing apparatus in the form of glasses. The AR glasses 10 have a photo-shooting function and a communication function. The AR glasses 10 include various sensors such as a sensor that acquires positional information of the AR glasses 10 (e.g., a Global Positioning System (GPS) sensor), and a gyroscope that detects an azimuth and a posture.

An object in the real space may hereinafter be referred to as "real object". The virtual object is a concept provided in contrast with the real object. For example, the virtual object is an image, a text, a graphical object, or other information. The image is a still image, a video, or a combination thereof.

The AR glasses 10 include a display 12 in the form of glasses, and a camera 14 that shoots the real space along a viewing direction of a user wearing the AR glasses 10. An image shot by the camera 14 is hereinafter referred to as "camera image". The display 12 may be a see-through or non-see-through display. The display 12 virtually displays an object in relation to a real object by AR. The virtual display of an object in relation to a real object means that a virtual object that is an example of an image showing the object is displayed on a screen of the display 12 while being laid over the real space. For example, a right-eye screen and a left-eye screen are generated and displayed on right and left displays based on parallax of eyes of the user. When the user views the real space through the display 12, the virtual object is laid over the real space as if the object actually existed in the real space.

A head-mounted display (HMD) using AR or MR glasses or an HMD using MR may be employed in place of the AR glasses 10. A mobile terminal having a camera, such as a smartphone, a mobile phone, or a gaming device, may be employed in place of the AR glasses 10. In this case, the camera may shoot the real space and a virtual object may be displayed on a screen of the mobile terminal while being laid over an image of the real space.

The information processing system according to the first exemplary embodiment includes an information processing apparatus 16. Examples of the information processing apparatus 16 include a desktop or notebook personal computer (hereinafter referred to as "PC"), a tablet terminal, a smartphone, a workstation, and a server. The information processing apparatus 16 has a communication function to exchange information with the AR glasses 10. The information processing apparatus 16 may be installed in the AR glasses 10.

For example, the information processing apparatus 16 includes a communication device 18, a user interface (UI) 20, a memory 22, and a processor 24.

The communication device 18 is a communication interface (e.g., a network interface) having a communication chip, and has functions of transmitting data to and receiving data from other apparatuses.

The UI 20 includes at least one of a display or an operator. Examples of the display include a liquid crystal display and an EL display. Examples of the operator include a keyboard, input keys, and an operation panel. The UI 20 may be a touch panel having both a display and an operator.

The memory 22 has one or more data storage areas. Examples of the memory 22 include a hard disk drive, various memories (e.g., a RAM, a DRAM, and a ROM), other storages (e.g., an optical disc), and combinations thereof. For example, the memory 22 stores camera images, object images, and virtual objects.

The processor 24 controls operations of individual parts of the information processing apparatus 16. The processor 24 may include a memory.

For example, the processor 24 sets a first reference object and, if a second reference object identical or similar to the first reference object is recognized, causes the display 12 of the AR glasses 10 to virtually display a target object in relation to the second reference object. The target object is recognized in advance together with the first reference object. The first reference object, the second reference object, and the target object are real objects. The virtual display of the target object means that a virtual object showing the target object is displayed on the screen of the display 12 while being laid over the real space.

For example, the processor 24 may recognize the first reference object, the second reference object, and the target object by processing a camera image generated by the camera 14, or based on detection results from various sensors instead of the camera 14.

Examples of the second reference object similar to the first reference object include an object having a shape similar to the shape of the first reference object, and an object having a function similar to the function of the first reference object. For example, the object having a function similar to the function of the first reference object corresponds to a tablet terminal having a function equivalent to the function of a notebook PC serving as the first reference object. The second reference object similar to the first reference object may be an object in a category identical to that of the first reference object. For example, the object in a category identical to that of the first reference object corresponds to a notebook PC having a shape different from the shape of a notebook PC serving as the first reference object. For example, the processor 24 processes a camera image generated by the camera 14 to recognize a category of an object in the camera image. The user may set the category of the object with reference to the camera image.

Examples of processes to be performed by the information processing system according to this exemplary embodiment are described below in detail.

Example 1

Example 1 is described below.

Figure 2:
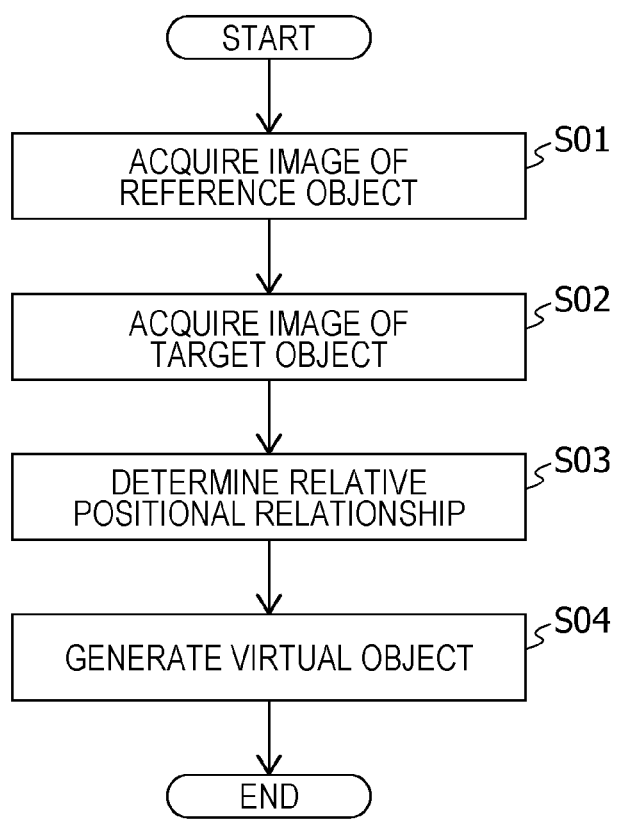
FIG. 2 is a flowchart illustrating an image acquisition process.

A process for acquiring images of the first reference object and the target object is described with reference to FIG. 2. FIG. 2 is a flowchart illustrating the process.

First, the camera 14 of the AR glasses 10 shoots an image and the processor 24 acquires an image of the first reference object from the camera 14 (S01). The processor 24 stores the image of the first reference object in the memory 22.

The user may select the first reference object, or the processor 24 may recognize an object viewed by the user for the longest time as the first reference object.

An example of selection of the first reference object by the user is described below.

Figure 3:
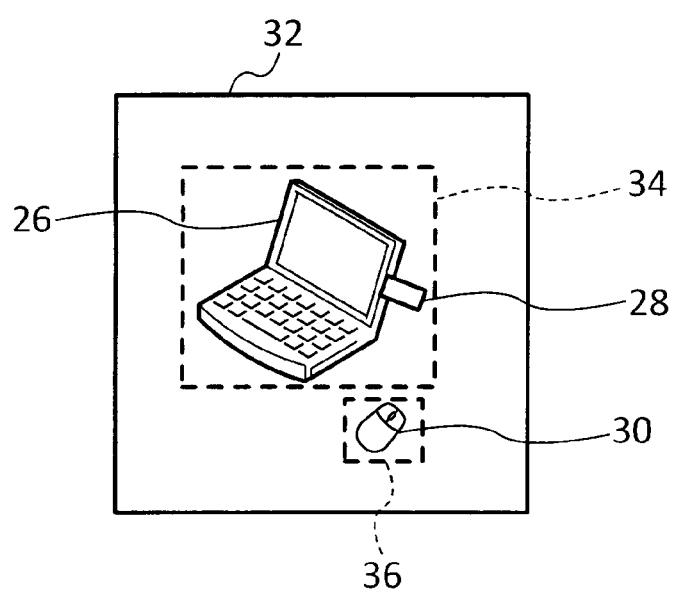
FIG. 3 illustrates a display screen.

In response to the user giving an instruction to execute a reference object selection mode by gesture, voice, or operation for the UI 20, the information processing system enters the reference object selection mode. The camera 14 shoots real objects and the processor 24 recognizes the real objects based on a camera image generated by shooting. For example, the real objects are recognized by an image recognition technology using Vision API framework. The processor 24 causes the display 12 to display a recognition result. FIG. 3 illustrates a display example.

A display screen 32 illustrated in FIG. 3 is viewed by the user through the display 12 of the AR glasses 10. A notebook PC 26, a sticky note 28, and a mouse 30 are real objects. The processor 24 recognizes the notebook PC 26 and the mouse 30 as candidates for the first reference object. The processor 24 displays symbols 34 and 36 on the display screen 32 while laying the symbols 34 and 36 over the real space. The symbols 34 and 36 indicate the candidates for the first reference object. The symbol 34 is an image indicating the notebook PC 26. The symbol 36 is an image indicating the mouse 30.

The user selects the first reference object from among the recognized real objects by gesture, voice, or operation for the UI 20. The processor 24 sets the selected real object as the first reference object. For example, in response to the user selecting the notebook PC 26, the processor 24 sets the notebook PC 26 as the first reference object and stores an image of the notebook PC 26 in the memory 22 as the image of the first reference object. The processor 24 may set this first reference object as a default first reference object.

The images of the real objects (e.g., the notebook PC 26, the sticky note 28, and the mouse 30) shot by the camera 14 may be displayed on the display 12 and the user may select the image of the first reference object from among the displayed images. The processor 24 sets the real object in the selected image as the first reference object.

As another example, the image of the first reference object may be prestored in a server and the processor 24 may recognize the first reference object based on the image. For example, the image of the first reference object is prestored in the server. The image of the first reference object is linked to identification information of the first reference object. The processor 24 recognizes the first reference object based on the identification information.

The processor 24 acquires an image of the target object from the camera 14 (S02). The processor 24 may recognize, as the target object, an object in contact with the first reference object, an object near the first reference object (e.g., an object within a predetermined distance range from the position of the first reference object), an object selected by the user, or an object other than the first reference object within a view field of the camera 14. The processor 24 stores the image of the target object in the memory 22.

Next, the processor 24 determines a relative positional relationship between the first reference object and the target object based on the camera image generated by the camera 14 (S03). For example, the camera image shows the first reference object and the target object and the processor 24 analyzes the camera image to determine the relative positional relationship between the first reference object and the target object in the camera image. For example, the processor 24 determines a position of the target object relative to the position of the first reference object in the camera image. The processor 24 stores information indicating the relative positional relationship (e.g., information indicating the position of the target object relative to the position of the first reference object) in the memory 22.

Next, the processor 24 generates a virtual object representing the target object based on the image of the target object (S04). If the target object contains a text or symbol, the processor 24 may recognize the text or symbol by recognizing characters in the image of the target object through optical character recognition (OCR) or the like. The virtual object representing the target object may be the image of the target object, or a schematic image representing the target object. The processor 24 stores the virtual object in the memory 22. If the text or symbol is recognized, the processor 24 stores the virtual object in the memory 22 together with the recognition result.

For example, in response to selection of the sticky note 28 in FIG. 3 as the target object, the processor 24 generates a virtual object representing the sticky note 28. The processor 24 may recognize a text or symbol on the sticky note 28 through character recognition and generate a virtual object containing the recognition result.

Figure 4:
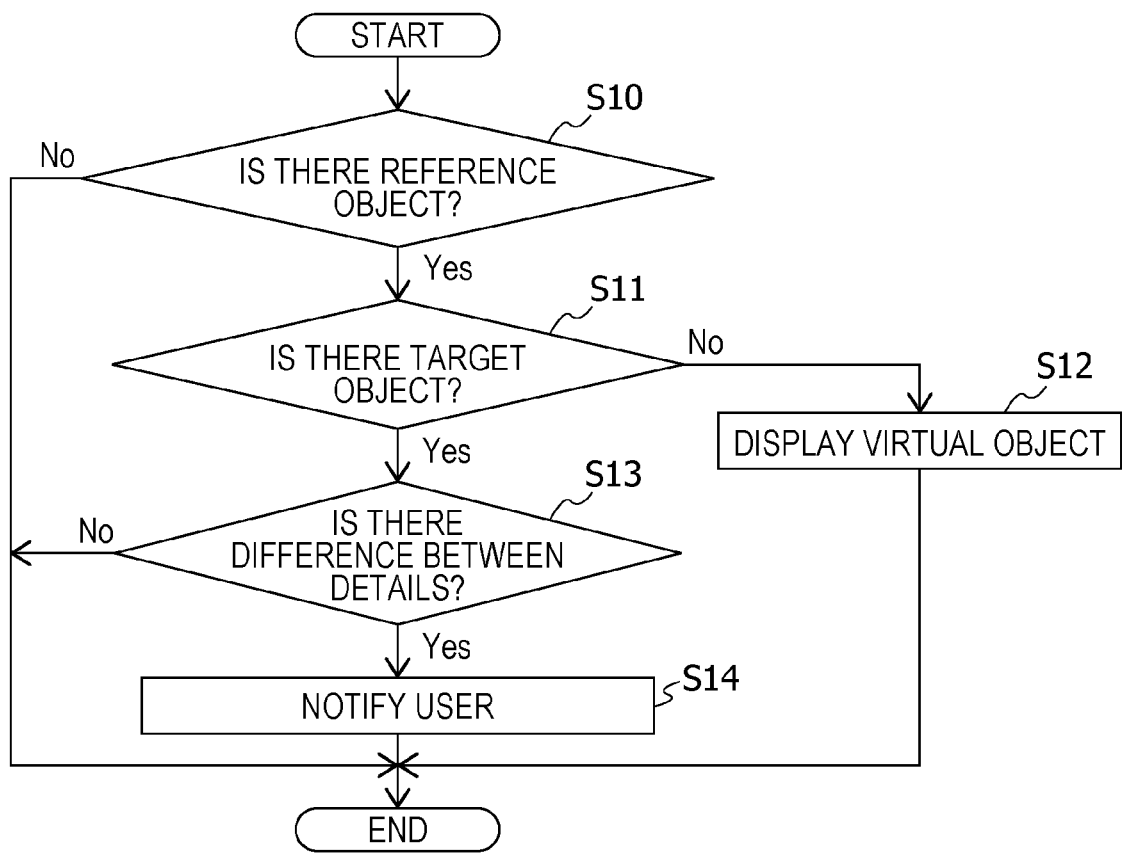
FIG. 4 is a flowchart illustrating a virtual object display process.

A virtual object display process is described below with reference to FIG. 4. FIG. 4 is a flowchart illustrating the process.

First, the camera 14 of the AR glasses 10 shoots an image and the processor 24 analyzes the camera image generated by the camera 14 to determine whether a second reference object identical to the first reference object is in a view field of the AR glasses 10. For example, the processor 24 processes the camera image by pattern matching (e.g., OpenCV) to determine whether the camera image shows the second reference object identical to the first reference object (i.e., whether the second reference object identical to the first reference object is in the view field of the AR glasses 10). The image of the first reference object is stored in the memory 22 and the processor 24 processes the camera image by pattern matching using the image of the first reference object to determine whether the camera image shows the second reference object identical to the first reference object.

If the second reference object identical to the first reference object is not in the view field of the AR glasses 10 (S10: No), the process is terminated.

If the second reference object identical to the first reference object is in the view field of the AR glasses 10 (S10: Yes), the processor 24 determines whether the target object is in the view field of the AR glasses 10. The image of the target object is stored in the memory 22 and the processor 24 processes the camera image by pattern matching using the image of the target object to determine whether the camera image shows the target object (i.e., whether the target object is in the view field of the AR glasses 10).

If the target object is not in the view field of the AR glasses 10 (S11: No), the processor 24 reflects the relative positional relationship between the first reference object and the target object in a positional relationship between the second reference object and the target object to be virtually displayed, and displays the virtual object representing the target object on the screen of the display 12 while laying the virtual object over the real space (S12). If the target object is not in the view field of the AR glasses 10, the target object is not recognized together with the second reference object identical to the first reference object. In this case, the processor 24 displays the virtual object representing the target object in relation to the second reference object. More specifically, the processor 24 determines a display position of the virtual object representing the target object on the screen of the display 12 relative to the position of the second reference object (i.e., the object identical to the first reference object) that is in the view field of the AR glasses 10 in the real space based on the relative positional relationship between the first reference object and the target object determined in Step S03. Then, the processor 24 displays the virtual object representing the target object at the relative position on the screen of the display 12. The processor 24 may hide or remove the virtual object from the screen in response to a user's instruction (e.g., gesture or voice).

If the target object is in the view field of the AR glasses 10 (S11: Yes), the processor 24 does not display the virtual object but determines whether details of the target object differ from details of the virtual object representing the target object. If the target object is in the view field of the AR glasses 10 and recognized together with the second reference object, the processor 24 does not display the virtual object. The processor 24 determines whether the details of the target object shot and recognized together with the second reference object differ from the details of the virtual object representing the target object shot and recognized together with the first reference object in Step S02.

If there is no difference (S13: No), the process is terminated.

If there is the difference (S13: Yes), the processor 24 notifies the user that the details have the difference (S14). For example, the processor 24 may cause the display 12 to display information indicating that the details have the difference, or cause the display of the UI 20 to display the information. The processor 24 may notify the user that the details have a difference if the degree of the difference is equal to or higher than a predetermined threshold. For example, the processor 24 determines that the details have a difference if the sticky note serving as the target object is edited between the time when the sticky note is shot together with the first reference object and the time when the sticky note is shot together with the second reference object. Then, the processor 24 notifies the user that the details have the difference. The processor 24 may notify the user that the details have a difference if the shapes differ from each other.

The notified user may choose whether to display the virtual object representing the target object. In response to the user giving an instruction to display the virtual object by gesture, voice, or operation for the UI 20, the processor 24 displays the virtual object representing the target object similarly to the process of Step S12.

The processor 24 may notify the user that the details have a difference before the virtual object representing the target object is displayed, after the virtual object representing the target object is displayed, or simultaneously with the display of the virtual object representing the target object.

A process to be performed when the details have a difference is described below in detail.

If a single virtual object represents the target object, that is, if the number of target objects is one and a virtual object representing the target object is generated, the processor 24 causes the display 12 to display, for example, the name of the target object and a message for inquiring of the user whether to display the virtual object representing the target object. In response to a user's display instruction (e.g., selection of "OK"), the processor 24 causes the display 12 to display the virtual object. In response to a user's cancellation instruction, the processor 24 prevents the display 12 from displaying the virtual object. For example, the "OK" or cancellation instruction may be given by gesture, voice, or operation for the UI 20.

Figure 5:
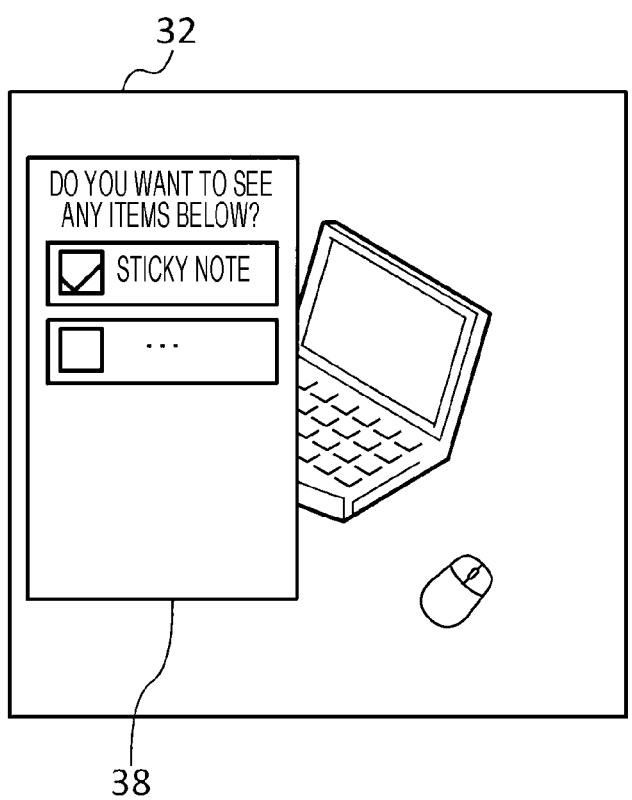
FIG. 5 illustrates a display screen.

If a plurality of target objects are present, the processor 24 causes the display 12 to display a list of the plurality of target objects. For example, as illustrated in FIG. 5, a list 38 is displayed on the display screen 32. In response to the user selecting a target object from the list 38 and giving a display instruction (e.g., selection of "OK"), the processor 24 causes the display 12 to display a virtual object representing the selected target object. For example, the selection of the virtual object and the "OK" instruction may be made by gesture, voice, or operation for the UI 20.

If a plurality of target objects are shot and recognized together with the first reference object and if the plurality of target objects are not in the view field of the AR glasses 10 when the second reference object is shot and recognized (S11: No), the processor 24 may display a list for selection of a target object to be virtually displayed (e.g., the list 38) on the display screen 32. The processor 24 causes the display 12 to display a virtual object representing the selected target object.

Example 2

Example 2 is described below.

Figure 6:
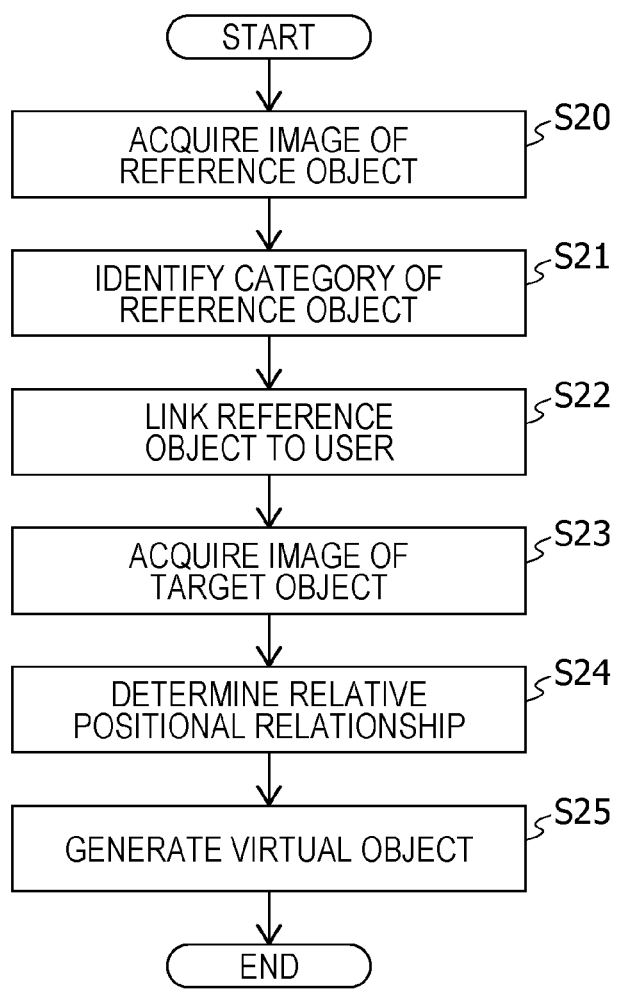
FIG. 6 is a flowchart illustrating an image acquisition process.

A process for acquiring images of the first reference object and the target object is described with reference to FIG. 6. FIG. 6 is a flowchart illustrating the process.

Similarly to Step S01, the camera 14 of the AR glasses 10 shoots an image and the processor 24 acquires an image of the first reference object from the camera 14 (S20). Similarly to Example 1, the user may select the first reference object, or the processor 24 may recognize an object viewed by the user for the longest time as the first reference object. The image of the first reference object is stored in the memory 22.

Next, the processor 24 identifies a category of the first reference object based on the image of the first reference object (S21). For example, the category of the first reference object is identified by recognizing the first reference object by an image recognition technology using Vision API framework. Specifically, a notebook PC, a desktop PC, a tablet PC, or a desk is identified as the category of the first reference object. Information indicating the category of the first reference object is linked to the image of the first reference object and stored in the memory 22.

Next, the processor 24 links the first reference object to a user ID of the user of the AR glasses 10 (S22). For example, the user of the AR glasses 10 logs into the AR glasses 10, the information processing apparatus 16, or a cloud service. For example, the user ID is linked to the image of the first reference object and stored in the memory 22. The user ID may be managed by a server or the like.

Similarly to Step S02, the processor 24 acquires an image of the target object from the camera 14 (S23). The processor 24 stores the image of the target object in the memory 22.

Similarly to Step S03, the processor 24 determines a relative positional relationship between the first reference object and the target object based on the camera image generated by the camera 14 (S24). Information indicating the relative positional relationship is stored in the memory 22.

Similarly to Step S04, the processor 24 generates a virtual object representing the target object based on the image of the target object (S25). The virtual object is stored in the memory 22.

Figure 7:
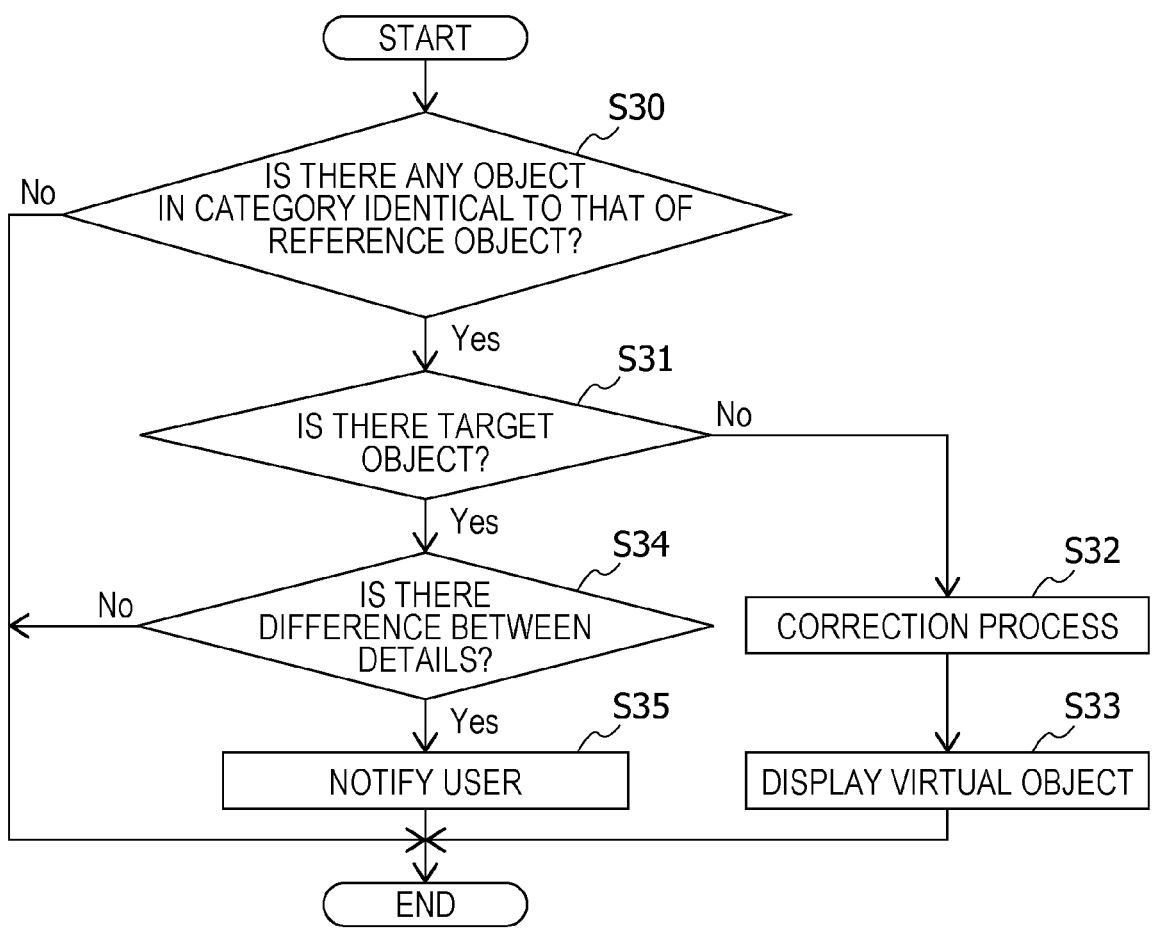
FIG. 7 is a flowchart illustrating a virtual object display process.

A virtual object display process is described below with reference to FIG. 7. FIG. 7 is a flowchart illustrating the process.

The following process is executed when the user logs in and wears the AR glasses 10. For example, the user logs into the AR glasses 10, the information processing apparatus 16, or a cloud service.

The camera 14 of the AR glasses 10 shoots an image and the processor 24 analyzes the camera image generated by the camera 14 to determine whether a second reference object in a category identical to that of the first reference object is in the view field of the AR glasses 10. The second reference object in a category identical to that of the first reference object is an example of the object similar to the first reference object. For example, the processor 24 processes the camera image by pattern matching (e.g., OpenCV) to determine whether the camera image shows the second reference object in a category identical to that of the first reference object (i.e., whether the second reference object in a category identical to that of the first reference object is in the view field of the AR glasses 10). The image of the first reference object and the information indicating the category of the first reference object are stored in the memory 22 and the processor 24 processes the camera image by pattern matching using the image of the first reference object to determine whether the camera image shows the second reference object in a category identical to that of the first reference object.

If the second reference object in a category identical to that of the first reference object is not in the view field of the AR glasses 10 (S30: No), the process is terminated.

If the second reference object in a category identical to that of the first reference object is in the view field of the AR glasses 10 (S30: Yes), the processor 24 determines, similarly to Step S11, whether the target object is in the view field of the AR glasses 10. The image of the target object is stored in the memory 22 and the processor 24 processes the camera image by pattern matching using the image of the target object to determine whether the camera image shows the target object (i.e., whether the target object is in the view field of the AR glasses 10).

If the target object is not in the view field of the AR glasses 10 (S31: No), the processor 24 executes a positional relationship correction process while the second reference object in a category identical to that of the first reference object is regarded as the first reference object (S32), reflects the relative positional relationship between the first reference object and the target object in a relative positional relationship between the second reference object and the target object to be virtually displayed, and displays the virtual object representing the target object on the screen of the display 12 while laying the virtual object over the real space (S33). If the target object is not in the view field of the AR glasses 10, the target object is not recognized together with the second reference object in a category identical to that of the first reference object. In this case, the processor 24 displays the virtual object representing the target object in relation to the second reference object. The correction process involves changing the size of the virtual object representing the target object depending on the ratio between the size of the first reference object and the size of the second reference object, and changing a display position of the virtual object representing the target object relative to the second reference object. A specific example of this virtual process is described later in detail.

If the target object is in the view field of the AR glasses 10 (S31: Yes), the processor 24 determines whether details of the target object differ from details of the virtual object representing the target object.

If there is no difference (S34: No), the process is terminated.

If there is the difference (S34: Yes), the processor 24 notifies the user that the details have the difference similarly to Step S14 (S35). Similarly to Example 1, the notified user may give an instruction to display the virtual object representing the target object. In response to the user giving the instruction to display the virtual object, the processor 24 displays the virtual object representing the target object.

For example, if the first reference object is a PC (A) and the second reference object is a notebook PC (B), the second reference object is not identical to the first reference object but is in a category identical to that of the first reference object. If the notebook PC (B) serving as the second reference object is in the view field of the AR glasses 10 and if the target object is not in the view field of the AR glasses 10, the virtual object representing the target object is laid over the real space.

Example 3

Example 3 is described below.

Figure 8:
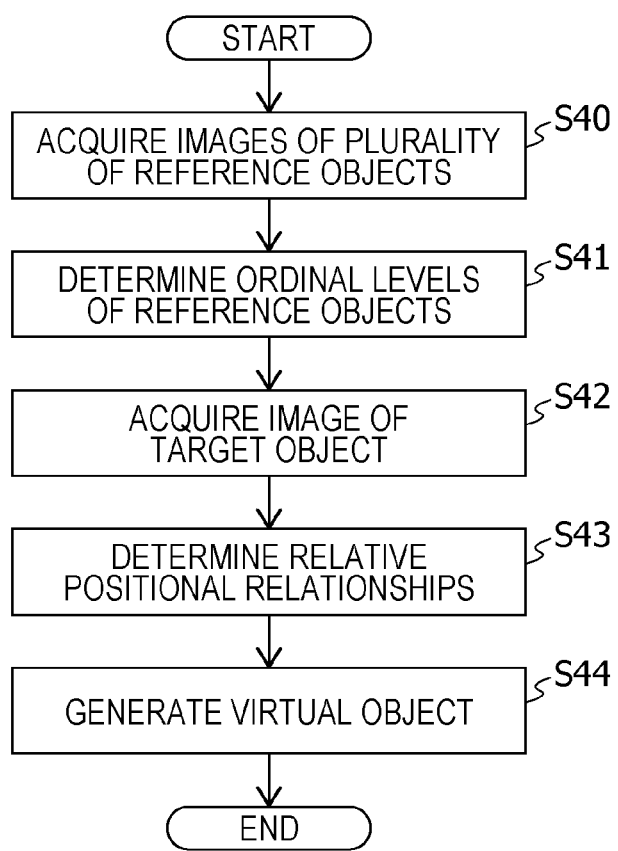
FIG. 8 is a flowchart illustrating an image acquisition process.

A process for acquiring images of the first reference object and the target object is described with reference to FIG. 8. FIG. 8 is a flowchart illustrating the process.

Similarly to Step S01, the camera 14 of the AR glasses 10 shoots an image and the processor 24 acquires an image of the first reference object from the camera 14 (S40). In Example 3, the processor 24 acquires images of a plurality of first reference objects. The images of the first reference objects are stored in the memory 22.

A process for acquiring the images of the plurality of first reference objects is described below in detail. The user may select the plurality of first reference objects, or the processor 24 may recognize the first reference objects in descending order of the length of time during which the user views the objects.

An example of selection of the plurality of reference objects by the user is described below.

Figure 9:
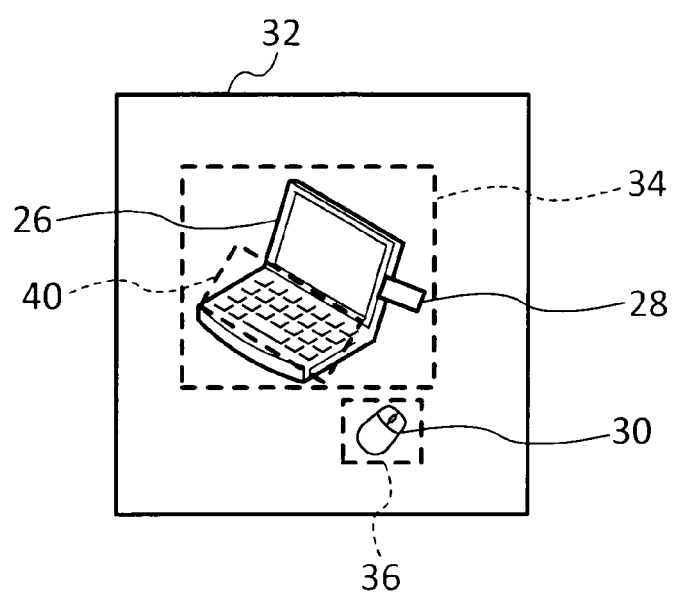
FIG. 9 illustrates a display screen.

In response to the user giving an instruction to execute the reference object selection mode by gesture, voice, or operation for the UI 20, the information processing system enters the reference object selection mode. The camera 14 shoots real objects and the processor 24 recognizes the real objects based on a camera image generated by shooting. For example, the real objects are recognized by an image recognition technology. The processor 24 causes the display 12 to display a recognition result. FIG. 9 illustrates a display example.

A display screen 32 illustrated in FIG. 9 is viewed by the user through the display 12 of the AR glasses 10. A notebook PC 26, a sticky note 28, and a mouse 30 are real objects. The processor 24 recognizes the notebook PC 26, the mouse 30, and a keyboard of the notebook PC 26 as candidates for the first reference object. The processor 24 displays symbols 34, 36, and 40 on the display screen 32 while laying the symbols 34, 36, and 40 over the real space. The symbols 34, 36, and 40 indicate the candidates for the first reference object. The symbol 34 is an image indicating the notebook PC 26. The symbol 36 is an image indicating the mouse 30. The symbol 40 is an image indicating the keyboard of the notebook PC 26.

The user selects the first reference object from among the recognized real objects by gesture, voice, or operation for the UI 20. The processor 24 sets the selected real object as the first reference object. For example, in response to the user selecting the notebook PC 26, the processor 24 sets the notebook PC 26 as the first reference object and stores an image of the notebook PC 26 in the memory 22 as the image of the first reference object. The user may select another real object as the first reference object. For example, in response to the user selecting the keyboard of the notebook PC 26 and the mouse 30, the processor 24 sets the keyboard of the notebook PC 26 and the mouse 30 as the first reference objects and stores an image of the keyboard of the notebook PC 26 and an image of the mouse 30 in the memory 22 as the images of the first reference objects. The processor 24 may set the order of selection as ordinal levels of the first reference objects.

In response to the user giving an instruction to terminate the reference object selection mode by gesture, voice, or operation for the UI 20, the reference object selection mode is terminated. Then, the plurality of selected real objects are set as the first reference objects.

Next, the processor 24 determines ordinal levels of the plurality of first reference objects (S41). The user may set the ordinal levels of the first reference objects, or the processor 24 may determine the ordinal levels of the first reference objects in descending order of the length of time during which the user views the first reference objects.

Similarly to Step S02, the processor 24 acquires an image of the target object from the camera 14 (S42). The processor 24 stores the image of the target object in the memory 22.

Similarly to Step S03, the processor 24 determines a relative positional relationship between the first reference object and the target object based on the camera image generated by the camera 14 (S43). Information indicating the relative positional relationship is stored in the memory 22. In Example 3, the plurality of first reference objects are set and therefore the processor 24 determines relative positional relationships between the individual first reference objects and the target object.

Similarly to Step S04, the processor 24 generates a virtual object representing the target object based on the image of the target object (S44). The virtual object is stored in the memory 22.

Figure 10:
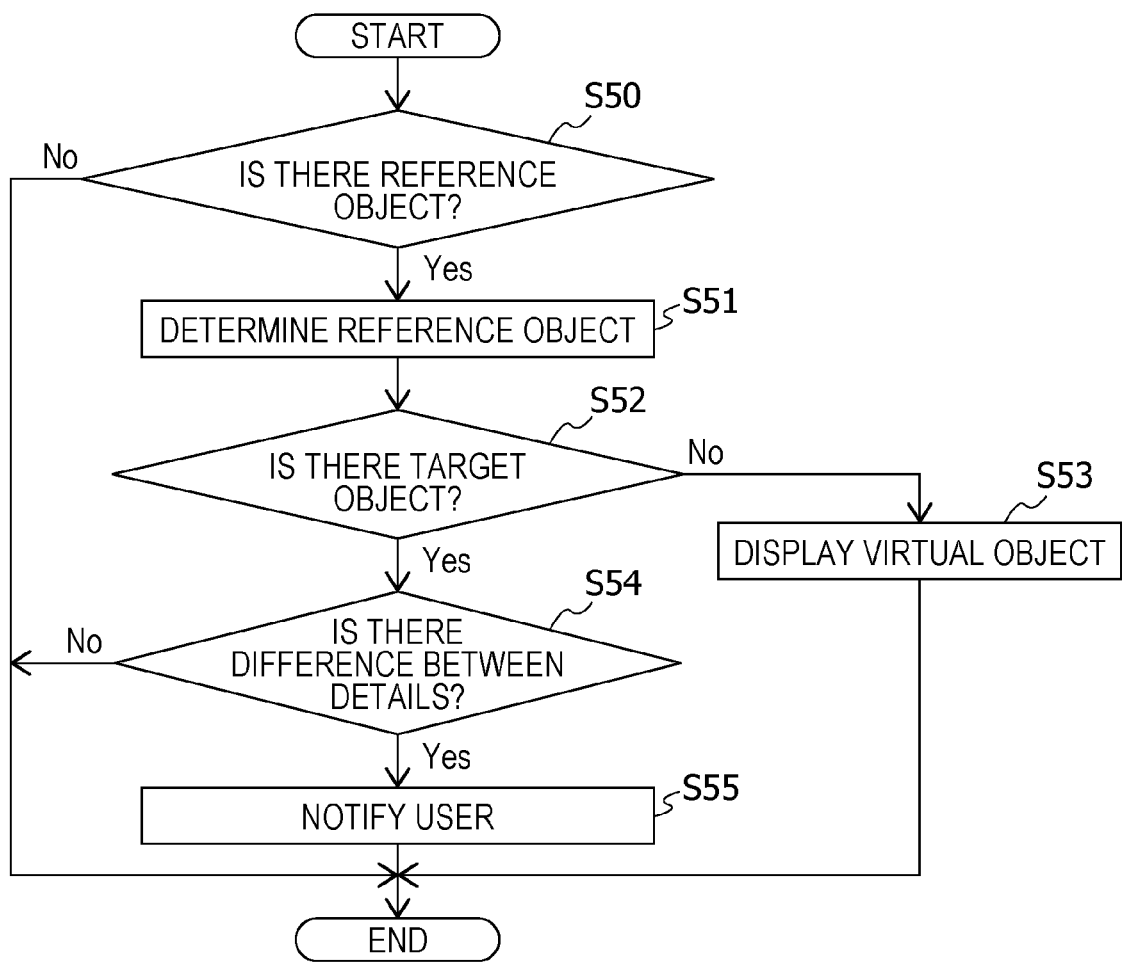
FIG. 10 is a flowchart illustrating a virtual object display process.

A virtual object display process is described below with reference to FIG. 10. FIG. 10 is a flowchart illustrating the process.

The camera 14 of the AR glasses 10 shoots an image and the processor 24 analyzes the camera image generated by the camera 14 to determine whether a second reference object identical to at least one first reference object out of the plurality of first reference objects is in the view field of the AR glasses 10.

If no second reference object identical to the first reference object is in the view field of the AR glasses 10 (S50: No), the process is terminated.

If the second reference object identical to at least one first reference object is in the view field of the AR glasses 10 (S50: Yes), the processor 24 determines a second reference object for use in the subsequent process based on the ordinal levels determined in Step S41 (S51). For example, the processor 24 determines an object identical to a first reference object having a higher ordinal level as the second reference object for use in the subsequent process.

Similarly to Step S11, the processor 24 determines whether the target object is in the view field of the AR glasses 10.

If the target object is not in the view field of the AR glasses 10 (S52: No), the processor 24 displays, similarly to Step S12, the virtual object representing the target object in relation to the second reference object determined in Step S51.

If the target object is in the view field of the AR glasses 10 (S52: Yes), the processor 24 determines, similarly to Step S13, whether details of the target object differ from details of the virtual object representing the target object.

If there is no difference (S54: No), the process is terminated.

If there is the difference (S54: Yes), the processor 24 notifies the user that the details have the difference similarly to Step S14 (S55). Similarly to Example 1, the notified user may give an instruction to display the virtual object representing the target object. In response to the user giving the instruction to display the virtual object, the processor 24 displays the virtual object representing the target object.

The processor 24 may determine whether a second reference object similar to at least one first reference object out of the plurality of first reference objects is in the view field of the AR glasses 10. If the second reference object similar to the first reference object is in the view field of the AR glasses 10, the positional relationship correction process is executed and the virtual object representing the target object is displayed in relation to the second reference object.

Figure 11:
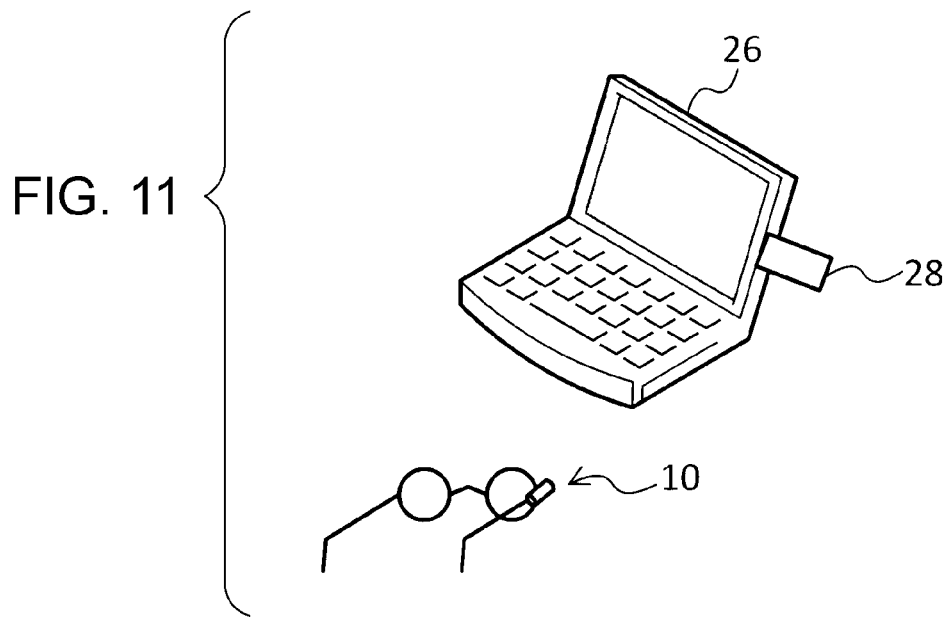
FIG. 11 schematically illustrates real objects in a real space.
Figure 12:
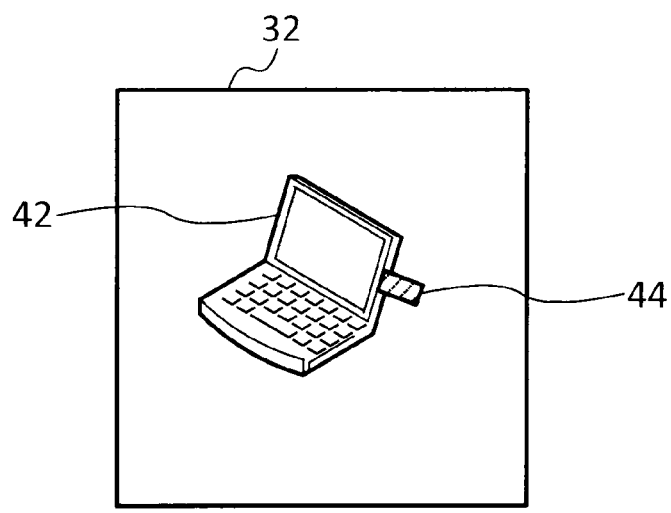
FIG. 12 illustrates a display screen.

A specific example of the first exemplary embodiment is described below with reference to FIG. 11 and FIG. 12. FIG. 11 schematically illustrates real objects in the real space. For example, the AR glasses 10, the notebook PC 26, and the sticky note 28 are illustrated as the real objects. FIG. 12 illustrates the display screen 32 of the AR glasses 10.

As illustrated in FIG. 11, for example, the camera 14 of the AR glasses 10 shoots the notebook PC 26 and the sticky note 28. The sticky note 28 is in contact with the notebook PC 26. The notebook PC 26 is recognized as the first reference object and an image of the notebook PC 26 is stored in the memory 22. The sticky note 28 is recognized as the target object and an image of the sticky note 28 is stored in the memory 22. A virtual object representing the sticky note 28 is generated and stored in the memory 22. For example, the user selects the notebook PC 26 as the first reference object and the sticky note 28 as the target object.

As illustrated in FIG. 12, for example, the user moves and a notebook PC 42 is in the view field of the AR glasses 10. The camera 14 shoots the notebook PC 42. The notebook PC 42 is a real object. The notebook PC 42 is an object different from the notebook PC 26 serving as the first reference object but is in a category identical to that of the notebook PC 26, that is, similar to the notebook PC 26. The sticky note 28 is not in contact with the notebook PC 42. Since the notebook PC 42 is an object in a category identical to that of the notebook PC 26, the processor 24 recognizes the notebook PC 42 as the second reference object. Since the sticky note 28 is not in contact with the notebook PC 42, that is, the sticky note 28 serving as the target object is not in the view field of the AR glasses 10, the processor 24 displays a virtual object 44 representing the sticky note 28 on the display screen 32. At this time, the processor 24 executes the correction process of Step S32 to reflect a relative positional relationship between the notebook PC 26 and the sticky note 28 in a relative positional relationship between the notebook PC 42 and the virtual object 44.

Figure 13:
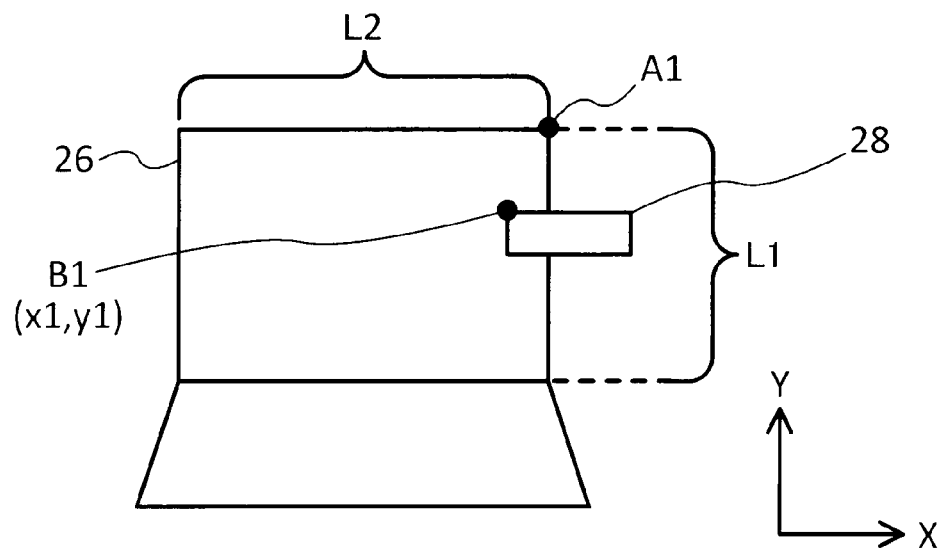
FIG. 13 schematically illustrates real objects in the real space.
Figure 14:
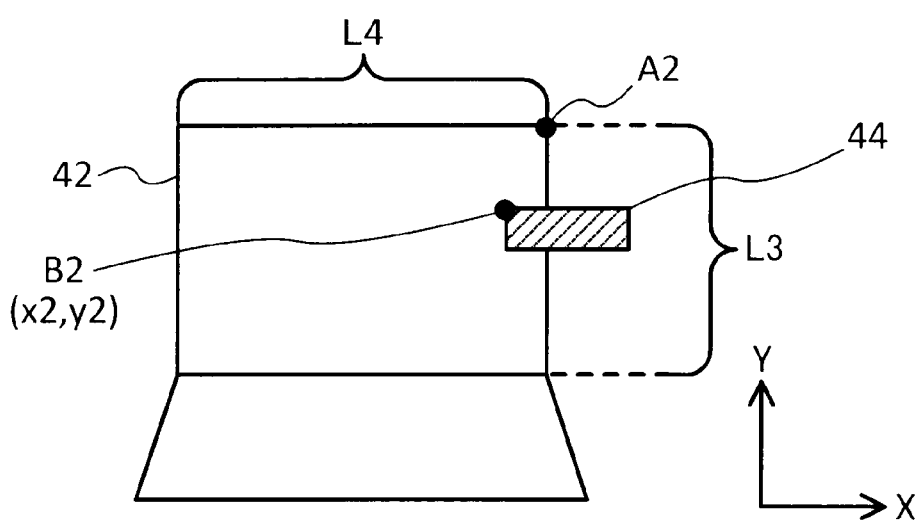
FIG. 14 schematically illustrates a real object and a virtual object.

The correction process is described below in detail with reference to FIG. 13 and FIG. 14. FIG. 13 schematically illustrates real objects in the real space. For example, the notebook PC 26 serving as the first reference object and the sticky note 28 serving as the target object are illustrated as the real objects. FIG. 14 schematically illustrates a real object and a virtual object. For example, the notebook PC 42 serving as the second reference object and the virtual object 44 representing the sticky note 28 are illustrated. The camera 14 of the AR glasses 10 shoots the notebook PC 42 serving as the second reference object and the virtual object 44 representing the sticky note 28 is displayed in relation to the notebook PC 42. The sticky note 28 is in contact with a display of the notebook PC 26.

First, the camera 14 shoots the notebook PC 26 and the sticky note 28 and the processor 24 extracts a shape (e.g., a rectangle) of a portion in contact with the sticky note 28 (e.g., the display of the notebook PC 26) and a shape (e.g., a rectangle) of the sticky note 28 from a camera image generated by shooting.

Next, the processor 24 sets reference points on the display of the notebook PC 26 and the sticky note 28 in the camera image showing the notebook PC 26 and the sticky note 28. For example, if the sticky note 28 is provided on a right part of the display, the processor 24 sets a reference point A1 at the upper right corner of the display and a reference point B1 (x1, y1) at the upper left corner of the sticky note 28. The coordinate x1 of the reference point B1 is a coordinate on an X axis in a case where the reference point A1 is the origin. The coordinate y1 of the reference point B1 is a coordinate on a Y axis in the case where the reference point A1 is the origin. The X axis and the Y axis are orthogonal to each other and coordinates are defined in the camera image.

The processor 24 calculates a length L1 of the display of the notebook PC 26 on the Y axis and a length L2 of the display on the X axis based on the camera image showing the notebook PC 26 and the sticky note 28.

Next, the camera 14 shoots the notebook PC 42 and the processor 24 sets a reference point on the notebook PC 42 in a camera image generated by shooting. For example, the processor 24 sets a reference point A2 at the upper right corner of a display of the notebook PC 42.

The processor 24 calculates a length L3 of the display of the notebook PC 42 on the Y axis and a length L4 of the display on the X axis based on the camera image showing the notebook PC 42.

Next, the processor 24 calculates, based on the following expressions, a reference point B2 (x2, y2) on the virtual object in a case where the reference point A2 is the origin. The reference point B2 corresponds to the reference point B1 on the sticky note 28.

$$x2 = L4/L2 \times x1$$

$$y2 = L3/L1 \times y1$$

The coordinate x2 of the reference point B2 is a coordinate on the X axis in the case where the reference point A2 is the origin. The coordinate y2 of the reference point B2 is a coordinate on the Y axis in the case where the reference point A2 is the origin.

Similarly to the positional relationship, the processor 24 may reflect a relative size relationship between the first reference object and the target object in a relative size relationship between the second reference object and the virtually displayed target object (i.e., the virtual object). In the specific example described above, the processor 24 sets the reference point B2 at the upper left end and displays, on the display screen 32, the virtual object 44 that is α times as large as the sticky note 28.

The value α is a smaller one of (L4/L2) or (L3/L1).

By defining the value α in this manner, the virtual object is displayed in relation to the second reference object while keeping the relative size relationship between the first reference object and the target object.

If the size of the target object is smaller than a threshold, the processor 24 need not reflect the relative size relationship between the first reference object and the target object in the relative size relationship between the second reference object and the virtual object representing the target object. In this case, the processor 24 may display a virtual object having a predetermined minimum size, or a virtual object having an absolute value of the size of the shot target object.

Second Exemplary Embodiment

Figure 15:
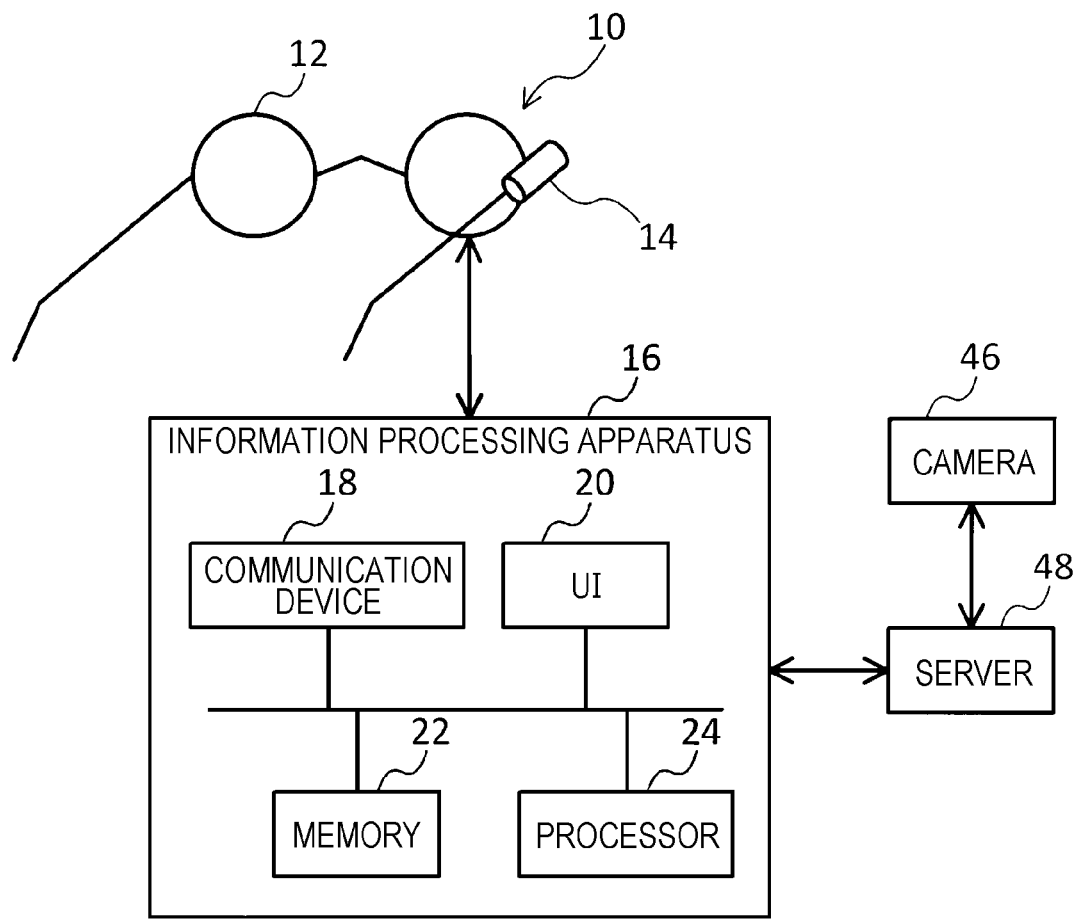
FIG. 15 is a block diagram illustrating the configuration of an information processing system according to a second exemplary embodiment.

An information processing system according to a second exemplary embodiment is described below with reference to FIG. 15. FIG. 15 illustrates an example of the hardware configuration of the information processing system according to the second exemplary embodiment.

The information processing system according to the second exemplary embodiment includes a camera 46 and a server 48 in addition to the AR glasses 10 and the information processing apparatus 16. The information processing apparatus 16 may be installed in the AR glasses 10 or the server 48. Examples of the camera 46 include a stationary observation camera installed at a predetermined location.

Figure 16:
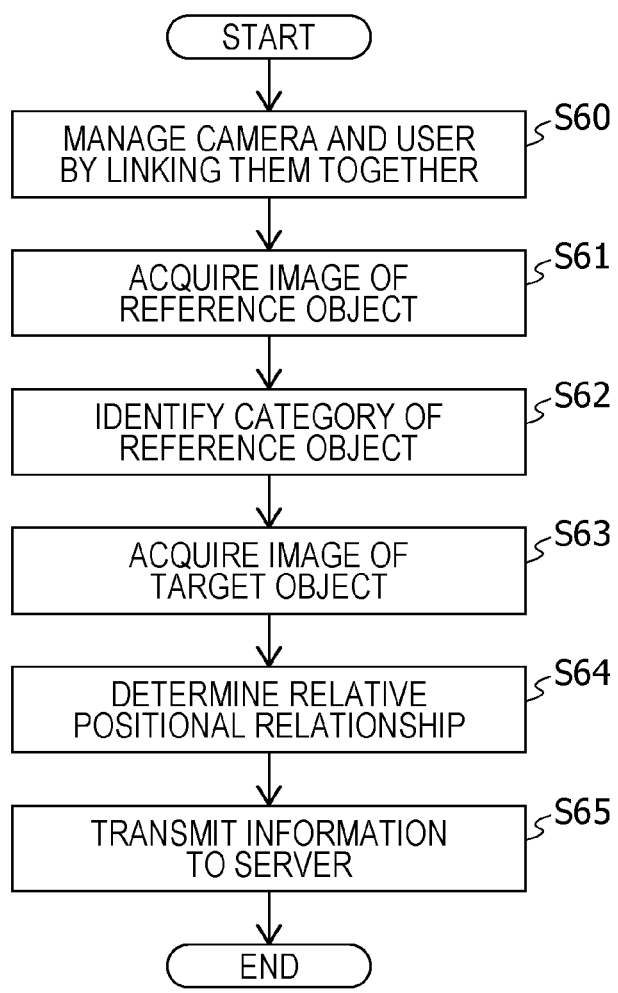
FIG. 16 is a flowchart illustrating an image acquisition process.

A process for acquiring images of the first reference object and the target object is described below with reference to FIG. 16. FIG. 16 is a flowchart illustrating the process.

First, the server 48 manages the camera 46 and the user ID by linking the camera 46 and the user ID together (S60). The link is made in advance. The link may be managed by the information processing apparatus 16.

Next, the camera 46 shoots the first reference object and an image of the first reference object is acquired (S61). For example, the image of the first reference object is stored in the server 48. The image of the first reference object may be stored in the memory 22 of the information processing apparatus 16.

Next, the processor 24 identifies a category of the first reference object based on the image of the first reference object (S62). If the image of the first reference object is stored in the server 48, the processor 24 acquires the image of the first reference object from the server 48 and identifies the category of the first reference object. The processor 24 links information indicating the category to the user ID. The information indicating the category may be stored in the server 48 or the memory 22 of the information processing apparatus 16.

Next, the camera 46 shoots the target object and an image of the target object is acquired (S63). The image of the target object may be stored in the server 48 or the memory 22 of the information processing apparatus 16. A virtual object representing the target object is generated based on the image of the target object. The virtual object may be generated by the processor 24 or the server 48. The virtual object is stored in the server 48.

Next, the processor 24 acquires a camera image generated by the camera 46 and determines a relative positional relationship between the first reference object and the target object based on the camera image (S64).

For example, the pieces of information (e.g., the camera image, the image of the first reference object, the image of the target object, the virtual object, and the information indicating the relative positional relationship) are periodically transmitted to and stored in the server 48 (S65).

Figure 17:
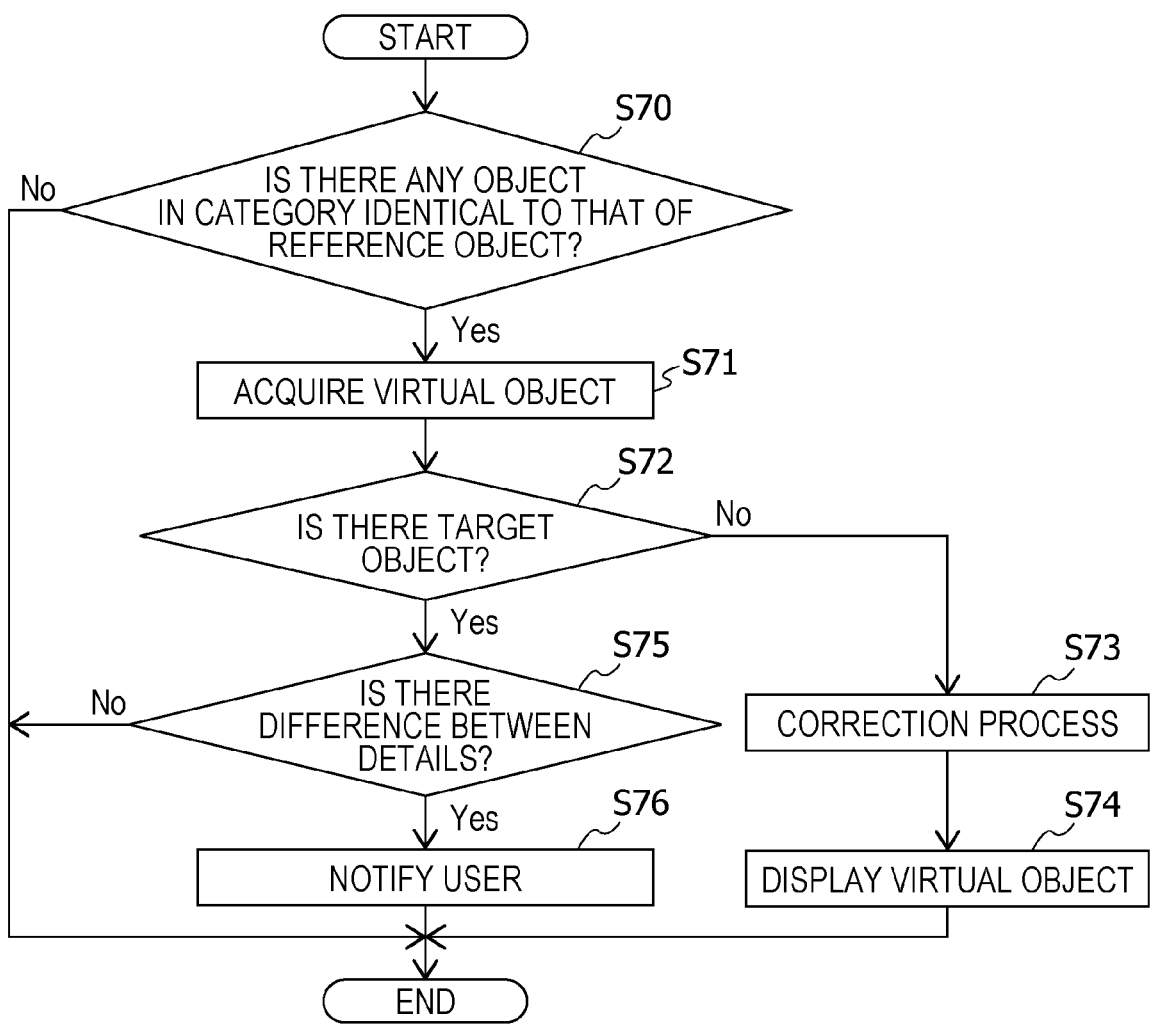
FIG. 17 is a flowchart illustrating a virtual object display process.

A virtual object display process is described below with reference to FIG. 17. FIG. 17 is a flowchart illustrating the process.

The following process is executed when the user logs in and wears the AR glasses 10. For example, the user logs into the AR glasses 10, the information processing apparatus 16, or the server 48.

The camera 14 of the AR glasses 10 shoots an image and the processor 24 analyzes the camera image generated by the camera 14 to determine whether a second reference object in a category identical to that of the first reference object is in the view field of the AR glasses 10.

If the second reference object in a category identical to that of the first reference object is not in the view field of the AR glasses 10 (S70: No), the process is terminated.

If the second reference object in a category identical to that of the first reference object is in the view field of the AR glasses 10 (S70: Yes), the processor 24 acquires the virtual object from the server 48 (S71).

If the target object is not in the view field of the AR glasses 10 (S72: No), the processor 24 executes the positional relationship correction process similarly to Step S32 while the second reference object in a category identical to that of the first reference object is regarded as the first reference object (S73). Then, the processor 24 reflects the relative positional relationship between the first reference object and the target object in a relative positional relationship between the second reference object and the virtual object and displays the virtual object on the screen of the display 12 while laying the virtual object over the real space (S74).

If the target object is in the view field of the AR glasses 10 (S72: Yes), the processor 24 determines whether details of the target object differ from details of the virtual object representing the target object.

If there is no difference (S75: No), the process is terminated.

If there is the difference (S75: Yes), the processor 24 notifies the user that the details have the difference similarly to Step S14 (S76). Similarly to Example 1, the notified user may give an instruction to display the virtual object representing the target object. In response to the user giving the instruction to display the virtual object, the processor 24 displays the virtual object representing the target object.

Figure 18:
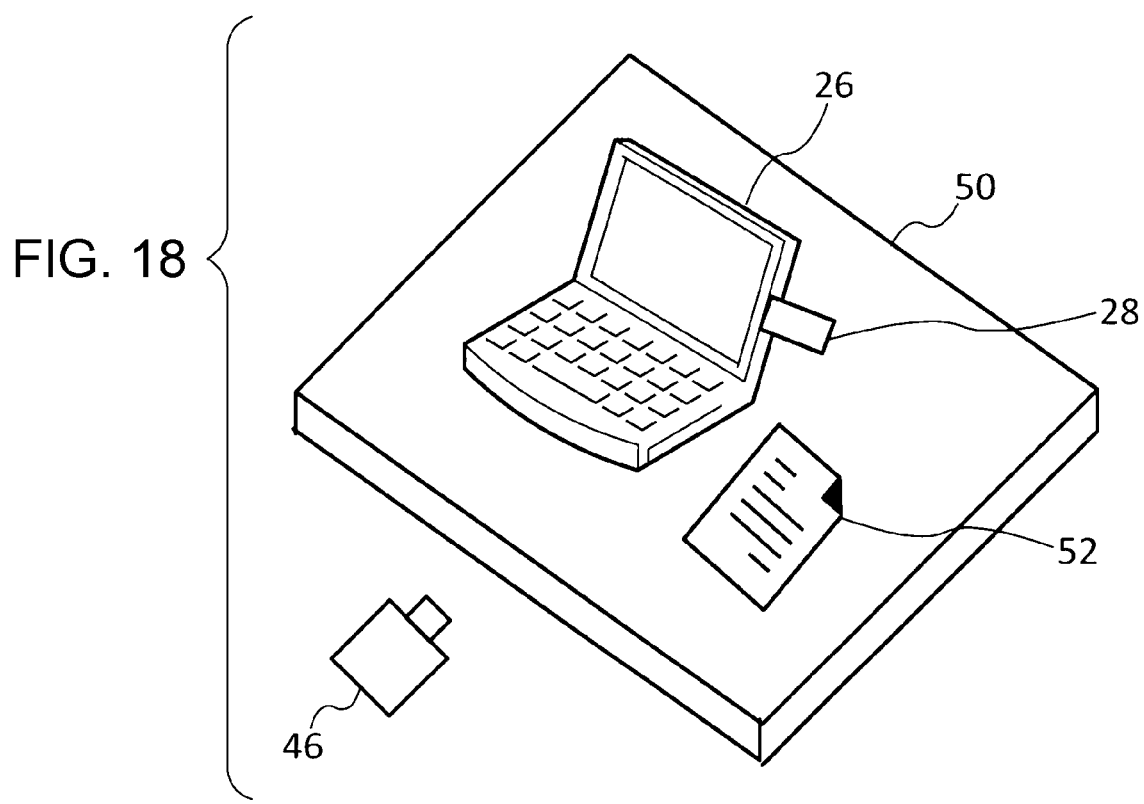
FIG. 18 schematically illustrates real objects in the real space.
Figure 19:
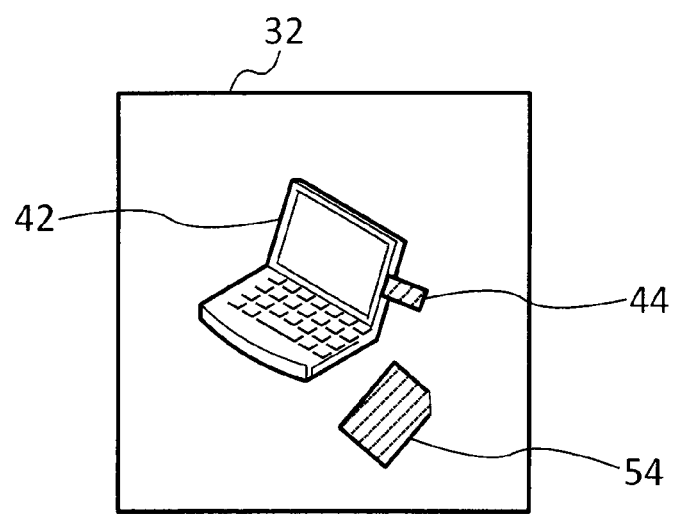
FIG. 19 illustrates a display screen.

A specific example of the second exemplary embodiment is described below with reference to FIG. 18 and FIG. 19. FIG. 18 schematically illustrates real objects in the real space. For example, the camera 46, the notebook PC 26, the sticky note 28, a desk 50, and paper 52 are illustrated as the real objects. FIG. 19 illustrates the display screen 32 of the AR glasses 10.

As illustrated in FIG. 18, for example, the camera 46 shoots the notebook PC 26, the sticky note 28, the desk 50, and the paper 52. For example, the camera 46 shoots an image in an office. The sticky note 28 is in contact with the notebook PC 26. The paper 52 is not in contact with the notebook PC 26 but is near the notebook PC 26. For example, the notebook PC 26 is recognized as the first reference object and an image of the notebook PC 26 is stored in the server 48. The sticky note 28 and the paper 52 are recognized as the target objects and images of the sticky note 28 and the paper 52 are stored in the server 48. Virtual objects representing the sticky note 28 and the paper 52 are generated and stored in the server 48. For example, the user selects the notebook PC 26 as the first reference object and the sticky note 28 and the paper 52 as the target objects.

As illustrated in FIG. 19, for example, the user wears the AR glasses 10 in his/her home or in a cafe and the notebook PC 42 is in the view field of the AR glasses 10. The camera 14 of the AR glasses 10 shoots the notebook PC 42. The notebook PC 42 is a real object. The notebook PC 42 is an object different from the notebook PC 26 serving as the first reference object but is in a category identical to that of the notebook PC 26. The sticky note 28 is not in contact with the notebook PC 42 and the paper 52 is not near the notebook PC 42. Since the notebook PC 42 is an object in a category identical to that of the notebook PC 26, the processor 24 recognizes the notebook PC 42 as the second reference object. Since the sticky note 28 is not in contact with the notebook PC 42, that is, the sticky note 28 serving as the target object is not in the view field of the AR glasses 10, the processor 24 displays the virtual object 44 representing the sticky note 28 on the display screen 32. At this time, the processor 24 executes the correction process to reflect a relative positional relationship between the notebook PC 26 and the sticky note 28 in a relative positional relationship between the notebook PC 42 and the virtual object 44. Since the paper 52 serving as the target object is not in the view field of the AR glasses 10, the processor 24 displays a virtual object 54 representing the paper 52 on the display screen 32. At this time, the processor 24 executes the correction process to reflect a relative positional relationship between the notebook PC 26 and the paper 52 in a relative positional relationship between the notebook PC 42 and the virtual object 54.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to
set a first real reference object in a real space, and
if a second real reference object identical or similar to the first real reference object is recognized in the real space, display a virtual version of a real target object on the second real reference object, wherein the real target object which is in contact with the first real reference object is recognized in the real space in advance together with the first real reference object.

2. The information processing apparatus according to claim 1, wherein a first relative positional relationship between the second real reference object and the virtual version of the real target object reflects a second relative positional relationship between the first real reference object and the real target object.

3. The information processing apparatus according to claim 2, wherein a first relative size relationship between the second real reference object and the virtual version of the real target object reflects a second relative size relationship between the first real reference object and the real target object.

4. The information processing apparatus according to claim 3, wherein, if a size of the real target object is smaller than a threshold, the first relative size relationship does not reflect the second relative size relationship.

5. The information processing apparatus according to claim 1, wherein a first relative size relationship between the second real reference object and the virtual version of the real target object reflects a second relative size relationship between the first real reference object and the real target object.

6. The information processing apparatus according to claim 5, wherein, if a size of the real target object is smaller than a threshold, the first relative size relationship does not reflect the second relative size relationship.

7. The information processing apparatus according to claim 1, wherein the processor displays the virtual version of the real target object on the second real reference object if the real target object is not recognized together with the second real reference object.

8. The information processing apparatus according to claim 1, wherein the processor avoids displaying the virtual version of the real target object on the second real reference object if the real target object is recognized together with the second real reference object.

9. The information processing apparatus according to claim 1, wherein, if first details of the real target object recognized together with the second real reference object differ from second details of the real target object recognized together with the first real reference object, the processor notifies a user that the first details of the real target object recognized together with the second real reference object differ from the second details of the real target object recognized together with the first real reference object.

10. The information processing apparatus according to claim 9, wherein the processor is configured to,
before displaying the virtual version of the real target object, notify the user that the first details of the real target object recognized together with the second real reference object differ from the second details of the real target object recognized together with the first real reference object, and display the virtual version of the real target object on the second real reference object in response to the user giving an instruction to display the virtual version of the real target object.

11. The information processing apparatus according to claim 1, wherein a category of the second real reference object is identical or similar to a category of the first real reference object.

12. The information processing apparatus according to claim 1, wherein the real target object is recognized in advance together with a plurality of first real reference objects, and wherein, if the second real reference object identical or similar to at least one first real reference object out of the plurality of first real reference objects is recognized, the processor displays the virtual version of the real target object on the second real reference object.

13. The information processing apparatus according to claim 1, wherein, if a plurality of real target objects are recognized together with the first real reference object and if the second real reference object identical or similar to the first real reference object is recognized, the processor displays a list of the plurality of real target objects for selection of a particular real target object for displaying the virtual version of the real target object.

14. A non-transitory computer readable medium storing a program causing a computer to execute a process comprising:

setting a first real reference object in a real space; and if a second real reference object identical or similar to the first real reference object is recognized in the real space, displaying a virtual version of a real target object on the second real reference object, wherein the real target object which is in contact with the first real reference object is recognized in the real space in advance together with the first real reference object.

\* \* \* \* \*